Patented Nov. 3, 1925.

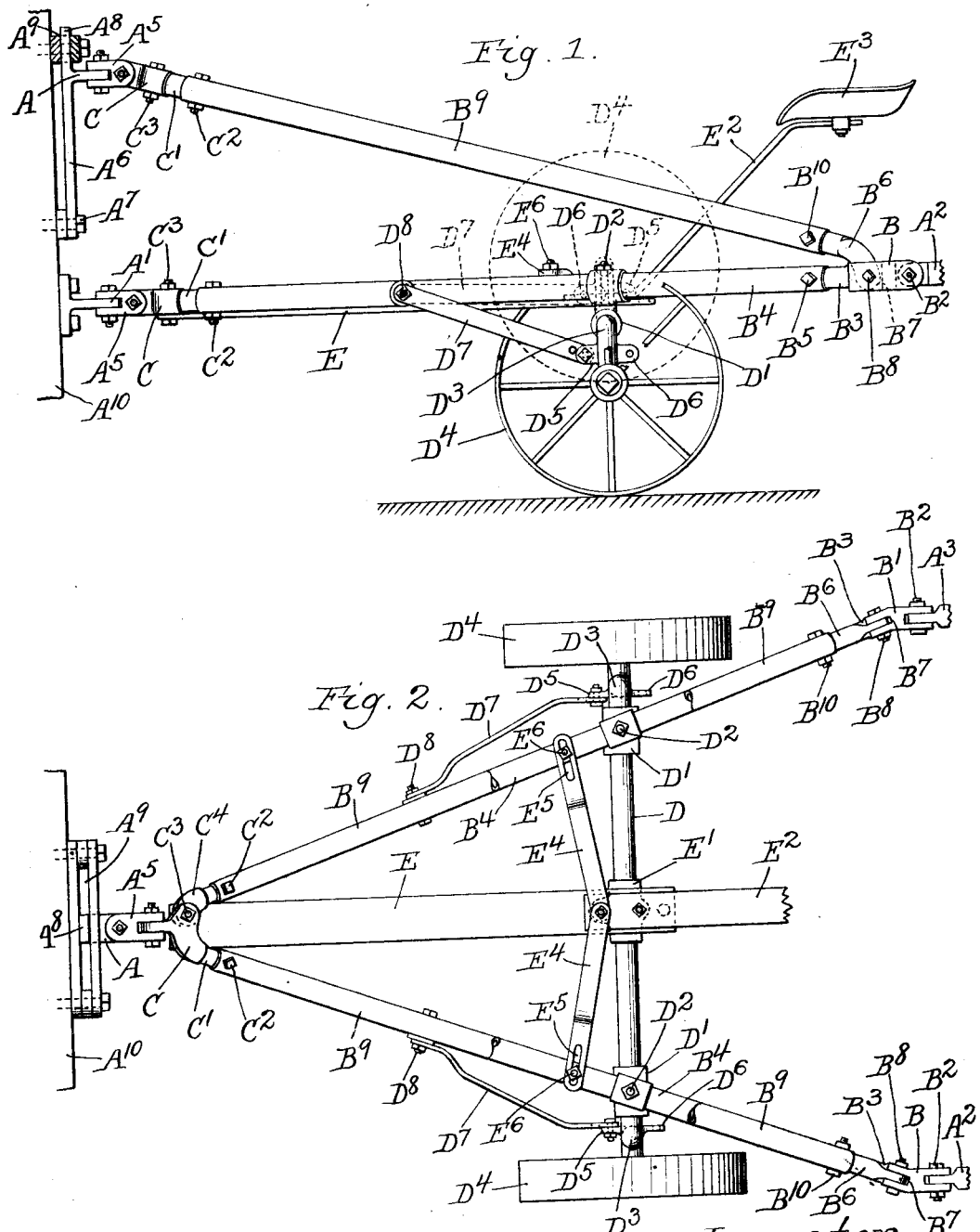

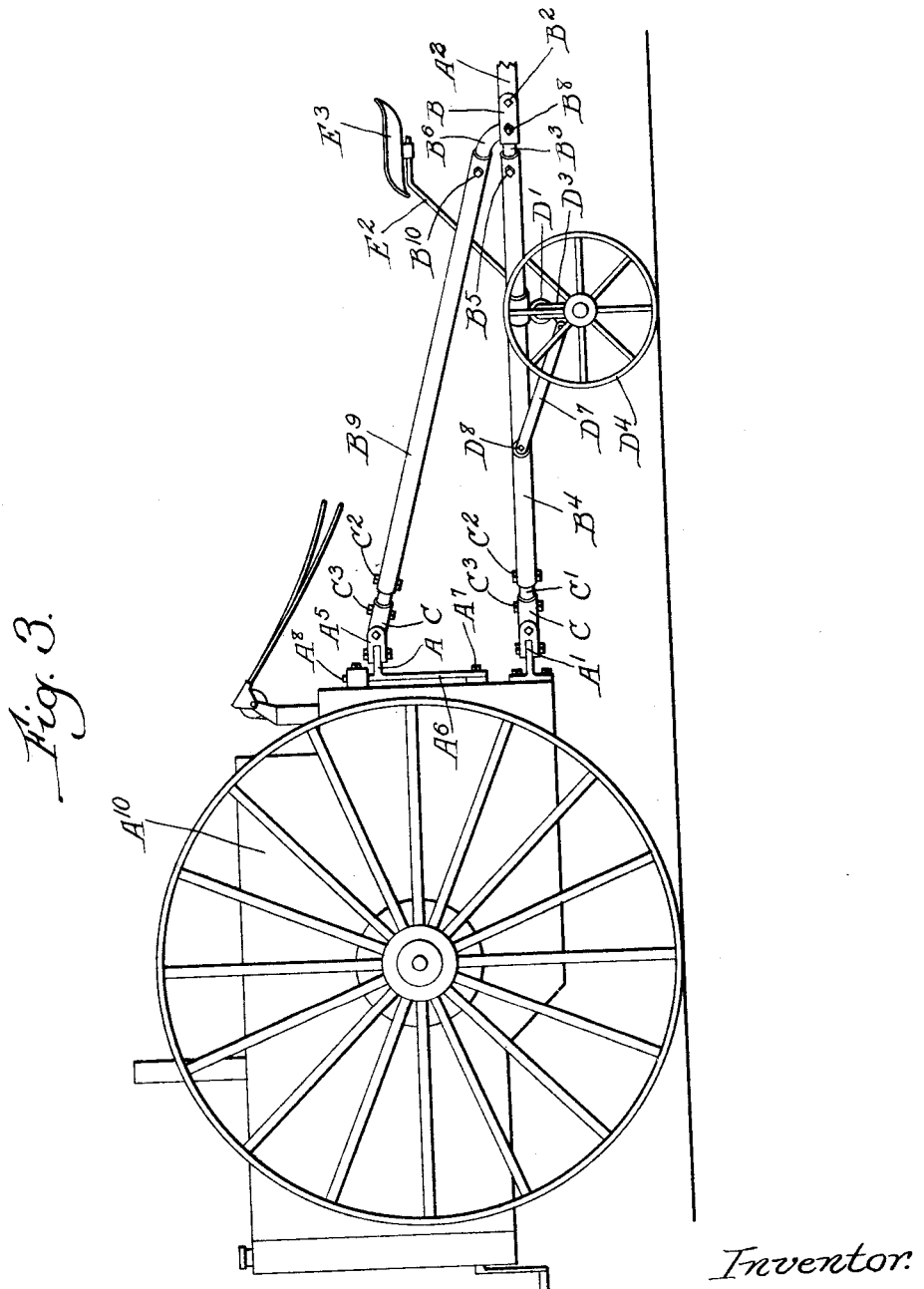

1,559,541

UNITED STATES PATENT OFFICE.

WILLIAM I. BALLENTINE OF LA PORTE, INDIANA, ASSIGNOR TO ADVANCE-RUMELY COMPANY, OF LA PORTE, INDIANA, A CORPORATION OF INDIANA.

TRAILER FOR TRACTORS.

Application filed February 6, 1922. Serial No. 524,429.

*To all whom it may concern:*

Be it known that I, WILLIAM I. BALLENTINE, a citizen of the United States, residing at La Porte, in the county of La Porte and State of Indiana, have invented a certain new and useful Improvement in Trailers for Tractors, of which the following is a specification.

My invention relates to improvements in trailers for tractors, and refers particularly to a combined trailer and draw bar mechanism which comprises a draw bar for the attachment of a two wheel agricultural tractor to the implement or wagon being drawn with a wheeled supporting mechanism by which the rear end of the two wheel tractor may be carried when the tractor is being moved about from place to place without being coupled to an implement or vehicle.

A further object of my invention is to provide a draw bar with wheels which may be utilized as additional support of the tractor during tractive connection between the draw bar and the vehicle drawn thereby. Another object is a provision of support for a draw bar structure in which the seat of the operator is positioned on the draw bar. Other objects will appear from time to time in the course of the specification and claims.

My invention is illustrated more or less diagrammatically in the accompanying drawings, wherein:

Figure 1 is a side elevation, showing the trailer wheels in the ground engaging position in full lines, and in the inoperative position in dotted lines;

Figure 2 is a plan view;

Figure 3 is a side elevation of tractor and trailer;

The tractor itself and the vehicle or implement being drawn are not here described, because they form no part of the invention:

A A' are lugs, projecting rearwardly from a conventional type of two wheel tractor, A'⁰ located one above the other. The details of the tractor do not form part of the present invention and will not be described herein. A' is in rigid relation with the tractor but A projects forward from a bar $A^6$, pivoted as at $A^7$, the top $A^8$ of which is adapted to oscillate in the slot $A^9$. $A^2$ $A^3$, are laterally spaced lugs projecting forwardly from the axle of a wagon or implement being propelled.

B B' are angle yokes slotted to engage the lugs $A^2$ $A^3$ and held to them by pivot bolts $B^2$ $B^2$ so that they may rotate about a horizontal axis. These yokes have forwardly projecting pins $B^3$ $B^3$ adjustable in the hollow lower A frame members, $B^4$ $B^4$ and held therein by means of bolts $B^5$. $B^6$, $B^6$, are elbow pins pivoted in slots $B^7$ on bolts $B^8$ on the members B, B', and in slidable and adjustable engagement with the hollow upper A frame members $B^9$, being held in position by the bolts $B^{10}$.

C, C, are yokes pivoted on the universal joint members $A^5$, $A^5$, which are pivoted on the lugs A, A'. These yokes have each a rearwardly extending pin C', slidable in one of the A frame members $B^4$ and $B^9$, and held in position by bolts $C^2$. Pivoted on these yokes on the pivot bolts $C^3$ are pin members $C^4$ slidable also in one of the members $B^4$, $B^9$. This arrangement provides two separate A frame members, one in a substantially horizontal plane, the other downwardly inclined from the rear end of the tractor, and the bases of the two A frames joined and pivoted at a point immediately in front of the point of attachment of the implement, the A frames being pivoted so that the sides may be drawn together or separated as the case may be, and being extensible in length so that the height of the base of the A frames above the ground may be adjusted with respect to their apices.

D is a crank axle mounted for rotation in bearing blocks D', D', on the lower A frame, these blocks being pivoted with respect to the frame by means of holding studs $D^2$, $D^2$, the bearings themselves being slidable along the axle. $D^3$, $D^3$, are cranks, shown in Figure 1, downwardly extending from the axle and having rotatably mounted thereon the ground wheels $D^4$. These cranks are provided with lugs $D^6$, $D^6$, adapted to be engaged by the links $D^7$, held in place by the bolts, as shown. These links are pivoted on the A frame members as at $D^8$. When in the position shown in full lines, the engagement of the links with the lugs $D^5$ locks the ground wheel in a downward position, and when in the dotted position attachment to the lugs $D^6$ would lock the lugs in the upper position.

E is a central strap held at its forward end by the pivot pin $C^3$, and riding at its rear end on a bearing block E' on the axle D. $E^2$ is a seat supporting spring bolted to the block E, and E³ is a seat carried by the spring. E⁴, E⁴, are adjusting links pivoted on the member E and slotted as at E⁵ to engage bolts E⁶ on the lower A frame, by which the bearing E' may be centered on the axis, half way between the two arms of the A frame, to position that seat.

It will be evident that while I have shown in the drawings an operative device, still many changes might be made in size, shape and arrangement of parts without departing materially from the spirit of my invention, and I wish, therefore, to have my drawings regarded as in a sense diagrammatic.

The use and operation of my invention are as follows:

I provide a combined draw bar and trailer element for a two wheel tractor, one function being to permit the attachment to the tractor of the load, and particularly of agricultural implements, plows and the like, drawn thereby.

Another function is the use of the trailer as a support for the tractor when it is without a load, since obviously the two wheel tractor type requires an additional support to prevent its tilting over.

When the tractor is in use and is drawing a load the implement or vehicle drawn is secured to the outer ends of the A frames in any suitable way. The unbalanced weight of the tractor being to the rear when it is moving forward there is a downward pressure through the A frames and on the supporting wheel or the implement or vehicle drawn. The height of the draw-bar trailer or its angular relation to the tractor may be adjusted, of course, by adjusting the lengths of the various frame members, the rear ends of the frame at the point of attachment to the vehicle being thus raised or lowered. The rearward tilting of the tractor is thus limited by the height of vehicle or implement, and the connection may be adjusted to suit such heights. The rearward tilting of the trailer is also limited by the supporting wheels which may also be adjusted or swung entirely out of contact with the ground when desirable. In the position shown in Figure 1 the upper and lower frames of the draw-bar trailer together form right angle triangles, with the right angle adjacent the attachment of the lower frame members to the tractor. This angle varies, of course, with the adjustment of the height of the vehicle or implement, but in any case the two frames are rigidly limited against movement in a vertical plane, but they tilt freely about a vertical axis to permit the tractor to turn. The lever A⁸ also permits the oscillation of the pivot point of the upper frame member, which compensates for the unevenness of the ground, as where one plow or wheel, for example, is several inches higher than the other, and thus lifts one arm of the trailer frame in relation to the other. The connection between the fixed lug A¹ and the member A⁵ is preferably fairly loose, in order to prevent bending or breakage because of lateral tilting of the lower A frame.

When the trailer is being used to draw implements the wheels are normally lifted out of contact with the ground, the axle and its crank being swung to the position shown by dotted lines in Figure 1, and the links D⁷ being secured to the lugs D⁶, as shown in dotted lines.

The seat of the operator is adjustably supported on the axle, the seat supporting spring resting on a bearing which is slidably and rotatably mounted in relation to the said axle.

When the implements have been disconnected, the axle is swung to the full line position shown in Figure 1, and the wheel then contacts the ground, the axle being kept in this position by connecting the links D⁷ with the lugs D⁵. The trailer in combination with the two wheel tractor makes, to all intents and purposes, a four wheel tractor, and the tractor may travel under its own power, without other support.

The width of the base of the frame may be adjusted by means of links E⁴, which are in adjustable connection with the side frame members B⁴, and the connecting links also permit the seat to be accurately centered in the middle of the device, if that is necessary. The sleeves D' and E' are slidable on the axle D, thus making both these adjustments easy.

While I have illustrated a draw bar trailer which is particularly adapted for use with a two-wheel tractor, it might also be used with the three or four wheel type if desired. Although it is particularly adaptable for drawing agricultural instruments, it may also be used to draw wagons or other vehicles.

I claim:

1. A tractor draw bar trailer comprising a plurality of superposed A frames, means for pivoting them at their apices to the tractor and at their rear ends to each other, a rotatable axle secured to the lower of said A frames, offset portions at each end thereof, wheels secured to said offset portions, and means for rotating said axle to raise and lower said wheels.

2. A tractor draw bar trailer comprising a plurality of superposed frame elements, means for pivotally securing them at their front ends to the tractor, and at their rear ends to each other, ground engaging wheels secured to one of them, means for securing said wheels out of contact with the ground.

3. A tractor draw bar trailer comprising a plurality of superposed A frames, pivoted at their apices to the tractor and secured together at their bases, the lower frame being fixed at its apex against lateral movement in relation to the tractor, and means in connection with the upper frame for permitting such lateral movement.

4. A tractor draw bar trailer comprising a plurality of superposed A frames, pivoted at their apices to the tractor and secured together at their bases, the lower frame being fixed at its apex against lateral movement in relation to the tractor, and means in connection with the upper frame for permitting such lateral movement, comprising a pivoted element to which the upper member is secured, and means for limiting its movement to oscillate in a plane transversal to the longitudinal axis of the tractor.

5. A tractor draw bar trailer comprising a plurality of superposed A frames, pivoted at their apices to the tractor and secured together at their bases, and supporting wheels rotatably mounted on the lower frame, and means for lifting them and holding them out of contact with the ground.

6. A tractor draw bar trailer comprising a draw bar frame pivoted to the rear of the tractor, supporting wheels mounted thereon, an axle on which said wheels are mounted, wheel supporting cranks at either end thereof, and means for securing them in an elevated position, comprising links adapted to engage said cranks at one end and the frame at the other, and a link engaging lug provided from each side of each crank.

7. A tractor draw bar trailer comprising a draw bar A frame pivoted to the rear of the tractor, supporting wheels secured thereto, an axle on which said wheels are mounted, and axle bearings pivotally and slidably mounted upon the outwardly inclined arms of said A frame.

8. A tractor draw bar trailer comprising a draw bar frame pivoted to the rear of the tractor, supporting wheels secured thereto, an axle therefor, and a seat supporting element resting upon said axle and in sliding relation therewith, and an adjustable link connection between said seat supporting member and the adjacent frame members.

9. A tractor draw bar trailer comprising a plurality of superposed A frames secured at their apices to the tractor and at their bases to each other, means for adjusting the width of the base of said frames, comprising an intermediate member, and an adjustable link connection between such member and the opposed sides of the A frames.

10. A tractor draw bar trailer comprising a plurality of superposed A frames secured at their apices to the tractor and at their bases to each other, an axle pivoted to the base of said frames and ground contacting wheel rotatably mounted thereupon, means for adjusting the width of the base of said frames, each arm of the lower of said frames being slidable longitudinally along said axle.

11. A tractor draw bar trailer comprising a plurality of superposed A frame elements, the apices of said frames being pivotally secured to the tractor at points vertically spaced apart, the outer ends of the arms of said A frames being secured to each other, the pivot of the upper A frame being mounted for lateral movement in relation to the tractor.

12. A tractor draw bar trailer comprising a rearwardly extending frame, said frame being connected to the tractor at a plurality of points along substantially the same vertical axis, a plurality of wheels mounted upon said frame, the connection between the frame and the tractor being adapted to permit a lateral play of the trailer in relation to the tractor at one of said pivot points.

13. A tractor draw bar comprising a plurality of superposed A frames, a hinge element pivoted on a horizontal axis to the apex of each of said A frames and pivoted on a vertical axis to the rear of the tractor, and means for permitting lateral play of one of said hinge members in relation to the tractor.

14. A tractor draw bar trailer comprising a plurality of superposed A frames secured at their apices to the tractor and at their bases to each other, and means positioned intermediate the ends of the A frame side bars for adjusting the angle of said side bars, and for holding said side bars in fixed relation when adjusted.

15. A tractor draw bar trailer comprising a plurality of superposed A frames secured at their apices to the tractor and at their bases to each other, and means intermediate the ends of said A frames for adjusting the width of the bases of said frames, comprising an adjusting link connection between the opposite sides of said A frames.

16. A tractor draw bar comprising a plurality of superposed A frames, a hinge element pivoted on a horizontal axis to the apex of each of said A frames, and pivoted on a vertical axis to the rear of the tractor.

Signed at La Porte county of La Porte and State of Indiana, this 2nd day of February, 1922.

WM. I. BALLENTINE.